Patented Feb. 8, 1949

2,460,974

UNITED STATES PATENT OFFICE 2,460,974

PREPARATION OF MOLYBDENUM COMPOUNDS

Michael C. Carosella, Niagara Falls, N. Y., assignor to United States Vanadium Corporation, a corporation of Delaware No Drawing. Application December 28, 1944, Serial No. 570,218

3 Claims. (Cl. 23—51)

This invention relates to the preparation and recovery of molybdenum compounds from ore materials and aqueous solutions containing both molybdenum and tungsten compounds.

Molybdenum and tungsten frequently occur together in ore deposits. Some ores contain readily separable tungsten and molybdenum minerals, but there are large quantities of ores in which the tungsten and molybdenum minerals are not so readily separable. For example, in some scheelite ores molybdenum is present as an isomorphic replacement of tungsten. Because of the difficulty of separating tungsten and molybdenum minerals from each other in this type of ore by ordinary mechanical methods of concentration, ore of this kind is subjected to chemical treatment to dissolve both molybdenum and tungsten therefrom. This treatment produces an aqueous solution containing both molybdenum and tungsten compounds, and the solution must then be treated to recover separately molybdenum and tungsten compounds. Similar solutions result from the treatment of molybdenum-bearing scrap in which molybdenum is contaminated by associated tungsten values.

It is the principal object of the present invention to provide an economical and efficient process for recovering a molybdenum compound from an aqueous solution containing both molybdenum and tungsten compounds. More specifically, it is an object of the invention to produce, from a solution containing both molybdenum and tungsten compounds, particularly a solution in which molybdenum compounds predominate, a molybdenum compound, substantially free from tungsten, which is useful without further treatment and which may be readily converted to other molybdenum compounds.

These objects are attained by the invention which is a process comprising the steps of adjusting the pH of an aqueous solution of molybdenum and tungsten compounds to a value between about 5 and 7.5, preferably between 5 and 7, by the appropriate addition of a mineral acid or an alkali, and then adding a mineral acid salt of an alkaline earth metal to the solution. For reasons of economy and convenience, calcium chloride is a preferred salt. Under these conditions there is precipitated from the solution a molybdate of the selected alkaline earth metal substantially free from tungsten compounds. Preferably, to promote separation of the molybdate from solution by filtration the solution is heated, say to a temperature between about 75° C. and its boiling point during the metal salt addition.

For example, an alkaline solution containing sodium tungstate and sodium molybdate, prepared for instance by digesting an ore containing molybdenum and tungsten minerals with a hot aqueous solution of an alkali metal compound such as sodium carbonate or sodium hydroxide having a strong basic reaction at a pressure of about 130 to 200 pounds per square inch (temperature about 180° C. to 198° C.), is treated with a mineral acid such as sulfuric acid to adjust the pH of the solution to a value between about 5 and 7.5. To this solution there is added, with stirring, a mineral acid salt of an alkaline earth metal. Suitably, at least about 80% of the amount of salt required to react with the molybdenum in the solution is used. During the addition of the metal salt the pH of the solution will fall to about 4 to 5.5. Molydenum is precipitated as a metal molybdate, but the tungsten remains in solution. The metal molybdate is then separated from solution by filtration. As explained above, this separation is promoted if the starting solution is maintained at a temperature between about 75° C. and its boiling point during the adjustment of its pH and the metal salt addition.

It is important that the pH of the solution be correctly adjusted before the metal salt is added. If the initial pH of the solution is greater than 7.5, tungsten will be co-precipitated with molybdenum upon the addition of the metal salt. If, on the other hand, the initial pH of the solution is below 5, the precipitation of molybdenum will be suppressed. Proper adjustment of the initial pH of the solution to a value between 5 and 7.5 makes possible the recovery of about 85% or more of the molybdenum in the solution without the precipitation of substantial quantities of tungsten when the metal salt is added to the solution.

If the pH of the initial solution containing molybdenum and tungsten compounds is below 5, it may be raised by the addition of an alkali metal compound having a strong basic reaction, such as a carbonate or hydroxide of an alkali metal.

The metal molybdate produced by the process of the invention may be calcined readily to a dust-free product, or it can be smelted to produce ferromolybdenum, under basic smelting conditions, if need be, to remove undesirable quantities of sulfur.

The process of the invention has been found to be economical and efficient in large scale operations. For example in one operation, 48,963 pounds of a solution containing 47.5 grams per liter of molybdenum and 12.1 grams per liter of tungsten obtained by pressure digestion with aqueous sodium carbonate solution of about 10,000 pounds of a roasted molybdenum-tungsten trisulfide were treated. This solution was heated to temperature of about 80° C., and 2,818 pounds of 94% sulfuric acid were added. The solution was then boiled to expel carbon dioxide. After boiling the pH of the solution was 6.7. To the solution, still at a temperature of about 85° C., were added 2,800 pounds of commercial calcium chloride. The pH of the solution dropped to 4.3 during this addition. Calcium molybdate was precipitated and was separated from the hot solution by filtration. The calcium molybdate precipitate so produced contained 40.9% molybdenum and only 0.47% tungsten.

The filtrate from such an operation contains substantially all of the tungsten present in the original solution together with a minor quantity of unprecipitated molybdenum. These elements may be recovered as a mixed precipitate of calcium tungstate and calcium molybdate by heating the solution, suitably to a temperature between about 90° C. and its boiling point, and adding hydrated lime thereto. The tungsten in this product may be recovered separately by known methods if desired.

It will be apparent to those skilled in the art that the process of the invention is not limited to the treatment of any particular starting solution. The invention is applicable generally to the treatment of aqueous solutions containing both molybdenum and tungsten compounds, no matter from what source such solutions are obtained.

I claim:

1. A process which comprises adjusting the pH of an aqueous solution containing molybdenum and tungsten compounds to a value between 5 and 7.5 and adding calcium chloride to the said solution, thereby precipitating substantially all of the molybdenum in said solution as calcium molybdate without precipitating any substantial quantity of tungsten.

2. Process which comprises adjusting the pH of an aqueous solution containing molybdenum and tungsten compounds to a value of between 5 and 7.5, heating said solution to a temperature between about 75° C. and its boiling point, and adding to the hot solution at least about 80% of the amount of calcium chloride sufficient to react with all of the molybdenum in the said solution, thereby precipitating substantially all of the molybdenum in said solution as calcium molybdate without precipitating any substantial quantity of tungsten.

3. A method of treating an ore material containing both molybdenum and tungsten compounds to recover a molybdenum compound therefrom, which method comprises digesting such ore material at a steam pressure of about 130 to 200 pounds per square inch with an aqueous solution of an alkali metal having a strong basic reaction, thereby producing an alkaline solution containing both molybdenum and tungsten compounds, adjusting the pH of said solution to a value between 5 and 7.5 by adding a mineral acid thereto, and adding calcium chloride to the said solution in an amount at least 80% of that theoretically sufficient to react with all of the molybdenum in said solution, thereby precipitating molybdenum as calcium molybdate therefrom without precipitating any substantial quantity of tungsten.

MICHAEL C. CAROSELLA.

REFERENCES CITED

The following references are of record in the file of this patent:

UNITED STATES PATENTS

| Number | Name | Date |
|---|---|---|
| 1,281,961 | Holladay | Oct. 15, 1918 |
| 1,403,035 | Kissock | Jan. 10, 1922 |
| 2,079,805 | Judd | May 11, 1937 |
| 2,339,888 | Smith | Jan. 25, 1944 |
| 2,351,678 | Hall | June 20, 1944 |